US010205663B1

(12) United States Patent
Jones et al.

(10) Patent No.: US 10,205,663 B1
(45) Date of Patent: Feb. 12, 2019

(54) MANAGING HOST COMPUTING DEVICES (71) Applicant: Amazon Technologies, Inc., Seattle, WA (US)

(72) Inventors: Harvo Reyzell Jones, Lake Forest, WA (US); Rafael Ortiz, Seattle, WA (US); Donavan Miller, Seattle, WA (US); Craig Howard, Seattle, WA (US); Tom Scholl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 694 days.

(21) Appl. No.: 14/582,125

(22) Filed: Dec. 23, 2014

(51) Int. Cl.
*H04L 12/741* (2013.01)

(52) U.S. Cl.
CPC .................................. *H04L 45/745* (2013.01)

(58) Field of Classification Search
CPC ......... H04L 45/02; H04L 45/04; H04L 41/12; H04L 45/16; H04L 45/44; H04L 45/741; H04L 45/38; H04L 45/507; H04L 61/2007; H04L 12/4633; H04L 61/2503; H04L 61/6059; H04L 61/2592; H04L 61/6068; H04L 61/6095
See application file for complete search history.

(56) References Cited

U.S. PATENT DOCUMENTS

| 8,606,938 B1* | 12/2013 | Chong | H04L 41/50 370/252 |
|---|---|---|---|
| 9,544,226 B1* | 1/2017 | Klausler | H04L 45/74 |
| 2005/0201302 A1* | 9/2005 | Gaddis | H04L 45/02 370/254 |
| 2006/0193247 A1* | 8/2006 | Naseh | H04L 45/04 370/216 |
| 2009/0073996 A1* | 3/2009 | Swallow | H04L 45/04 370/401 |
| 2015/0109904 A1* | 4/2015 | Filsfils | H04L 45/22 370/221 |
| 2015/0188881 A1* | 7/2015 | Bergman | H04L 61/2007 709/218 |

* cited by examiner

*Primary Examiner* — Romani Ohri
(74) *Attorney, Agent, or Firm* — Knobbe, Martens, Olson & Bear, LLP (57) ABSTRACT

Each point-of-presence advertises the network addresses it hosts and the network addresses hosted by other points-of-presence. Each point-of-presence also announces its own network addresses at a higher degree of specificity than the other network addresses it is announcing. When a point-of-presence fails, packets routed to a network address hosted by that point-of-presence will be routed to one of the other points-of-presence announcing the same network address. When a point-of-presence is available, its more specific network address announcements prevents packets routed to a network address hosted by that point-of-presence from being routed to any other point-of-presence.

20 Claims, 8 Drawing Sheets

MANAGING HOST COMPUTING DEVICES

BACKGROUND

Generally described, computing devices and communication networks can be utilized to exchange information. In a common application, a computing device can request content from another computing device via the communication network. For example, a user at a personal computing device can utilize a software application to request content from a content provider via a communication network.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and reliability in terms of availability of the components to provide requested content. To that extent, CDN service providers can operate computer networks that interconnect a number of computing devices to support operations or provide services to third parties. The computing systems can be located in a single geographic location or located in multiple, distinct geographic locations (e.g. interconnected via private or public communication networks). Specifically, data centers or data processing centers, herein generally referred to as a "data center," may include a number of interconnected computing systems to provide computing resources to users of the data center. However, in some instances, particular computing resources, such as individual cache servers, may become unavailable for a variety of reasons. In such instances, client computing devices may persist with the same network address information and attempt to establish connections with computing resources that have become unavailable or otherwise unreachable by the client computing device.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings.

DETAILED DESCRIPTION

The present application relates to systems and methods for maintaining the availability of components responsive to one or more network addresses. More specifically, aspects of the present application relate to maintaining the availability of network components responsive to IP addresses independent of an availability of individual components or network of components.

In accordance with an illustrative embodiment, a service provider configures a route management component and one or more individual points-of-presence ("POP") to generate information related to the routing of information to specific network addresses in accordance with network protocols, such as the Border Gateway Protocol ("BGP"). In accordance with this example, routers associated with the POP send or "advertise" information about the network addresses that are reachable through those routers. These advertisements are received by other routers on a network, which, in turn, use those advertisements to update their routing tables which can then influence network traffic.

In a simple embodiment, one or more components on a POP can be associated with a specific network address accessible via a public communication network such as the Internet. In another embodiment, one or more components can be associated with virtual network addresses, which are not assigned to specific servers or network interface cards. In this embodiment, a single networking component can be responsive to multiple network addresses that have been virtualized. Additionally, multiple components can advertise information about specific sets of network addresses such that a router, or routing layer, can select from among different available routing paths. One manner in which routing components can select from different available routing paths is to determine a level of specificity related to the most significant bits of the network address. For example, in one typical embodiment, network address information is a thirty-two bit identifier. If a first router advertises by identifying the twenty-four most significant bits of a network address and a second router advertises by identifying the twenty-five most significant bits, the second router is traditionally considered to have advertised according to a higher level of specificity. Accordingly, a router will typically route network traffic to a router advertising according to a higher level of specificity for a network address.

Illustratively, a set of POPs can be configured to announce multiple layers of specificity for sets of network addresses to provide for one or more failover levels for the collection of POPs.

In accordance with the present disclosure, each POP is associated with a primary source for a set of network addresses and advertises to routing layers according to a first layer of specificity for the assigned set of network addresses. Additionally, one or more POPs can also be associated as a second source for the set of network addresses associated to other POPs. These POPs would, in addition to the advertisements for their respective assigned set of network addresses, advertise for additional sets of network addresses at a second level of specificity, which would be a lower level of specificity than the first level.

In accordance with an illustrative embodiment, on receiving an incoming packet addressed to a virtual IP address hosted in an available point-of-presence on the network, a router checking its routing table sees that a network address for that point-of-presence is being advertised at a higher level of specificity than other network addresses corresponding to that virtual IP address. The router forwards the packet along the path toward the available point-of-presence hosting the virtual IP address.

With continued reference to the example, assume at some point, that one or more POPs become unavailable or unable to process additional packets. At this point, the router components would update routing tables to reflect that the previously advertised routing paths to the unavailable POP are no longer valid. Accordingly, on receiving a subsequent incoming packet addressed to a virtual IP address that was hosted in a now unavailable point-of-presence on the network, a router checking its routing table still sees one or more entries for the corresponding network address for the virtual IP address. The router selects one path and forwards the packet along the path toward an available point-of-presence. On receiving the packet, the available point of presence selected will recognize that the packet was part of a communications session with a virtual IP address that was hosted in an unavailable point-of-presence. The available point-of-presence begins a new communications session using the same virtual IP address. The new communications session can terminate when the unavailable point-of-presence becomes available again and the original communications session resumes.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of host computing device, one or more aspects of the present disclosure can be applied with regard to different types or configurations of physical computing devices or combinations thereof.

Figure 1:
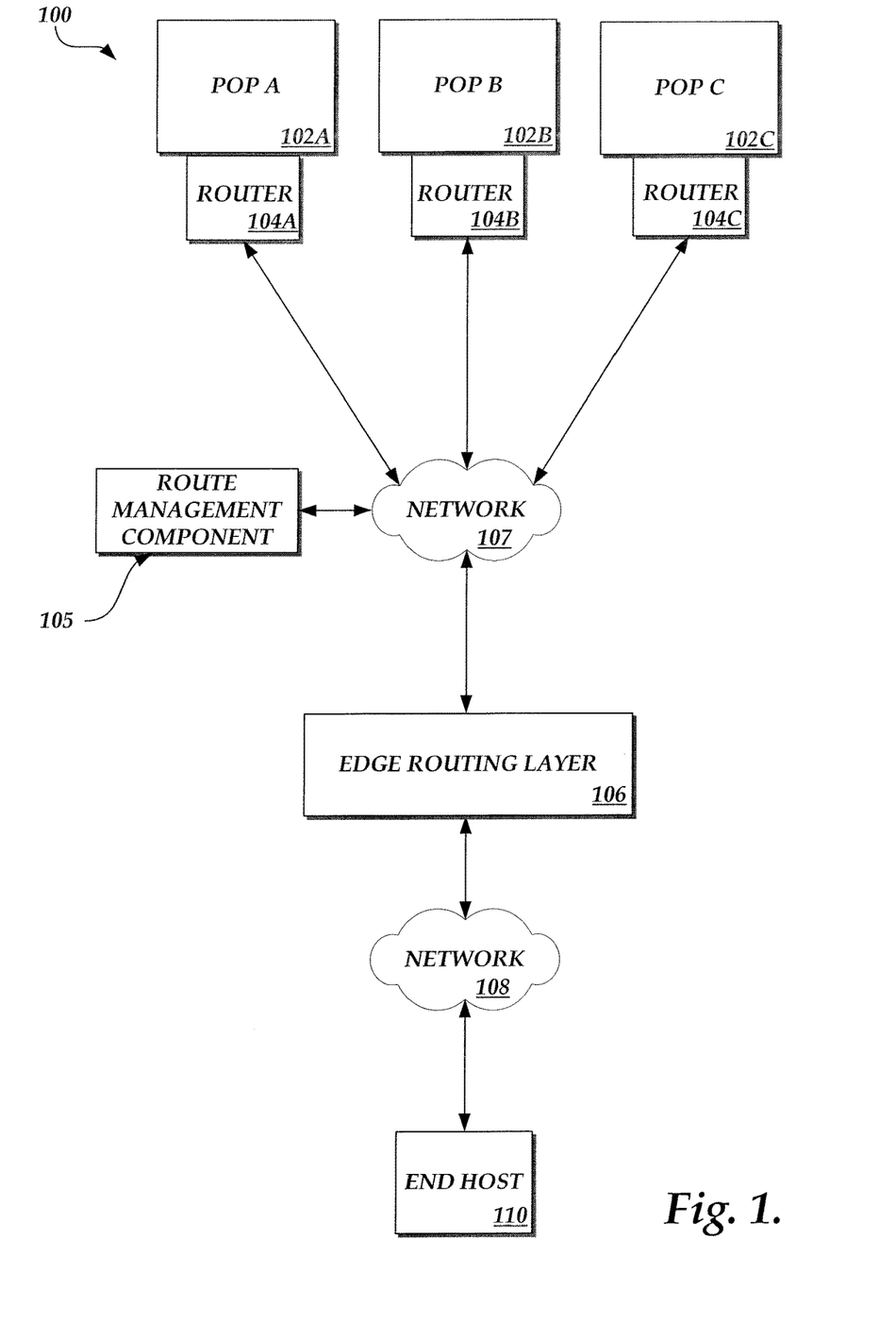
FIG. 1 is a block diagram illustrating an embodiment of a system having points-of-presence, routers, an edge routing layer, a network, and an end host.

FIG. 1 is a block diagram illustrating an embodiment of interconnected network components 100, including multiple points-of-presence ("POPs") 102. A more detailed description of an illustrative POP 102 will be described with regard to FIG. 2. Illustratively, one or more POPs are associated with a first routing layer, such as indicated by router 104 that is in communication with at least a second routing layer, as illustrated as edge routing layer 106, via a network 107. Illustratively, there can be any number N of POPs 102, and there can be one or more layers of intermediate routers in the network 107 between the routers 104 and the edge routing layer 106. In the illustrated embodiment, the routers 104 are connected to a network 107 which is connected to the edge routing layer 106. In other embodiments, the routers 104 connect directly to the edge routing layer 106. Illustratively, network components other than POPs 102 and routers 104 can be connected directly or indirectly to the edge routing layer 106 or the network 107

A route management component 105 can be connected to the network 107. The route management component 105 may operate as software within a network component, within the edge routing layer 106, or within a router 104 from the first routing layer. Illustratively, the route management component may also be a physical device connected to or within the network 107, the edge routing layer 106, the routers 104 in the first routing layer, or the aggregate routing component 114 within the POP 102 as illustrated in FIG. 2.

The edge routing layer 106 can connect to a network 108. In some embodiments, the network 108 can be a public network such as, for example, the internet. In some embodiments, the network 108 can be a private network. An end host 110 is connected to the network 108. By way of non-limiting example, the end host 110 can be any network component capable of a communications session with a POP 102, such as a personal computer, a public terminal, a server, a mobile device, or a smart appliance or smart gadget. The edge routing layer 106 may include one or more routers. In some embodiments, each router in the edge routing layer 106 can have a public IP address that is globally unique. In other embodiments, each router in the edge routing layer 106 can have a private IP address, such as, for example, when the network 108 is a private network.

Figure 2:
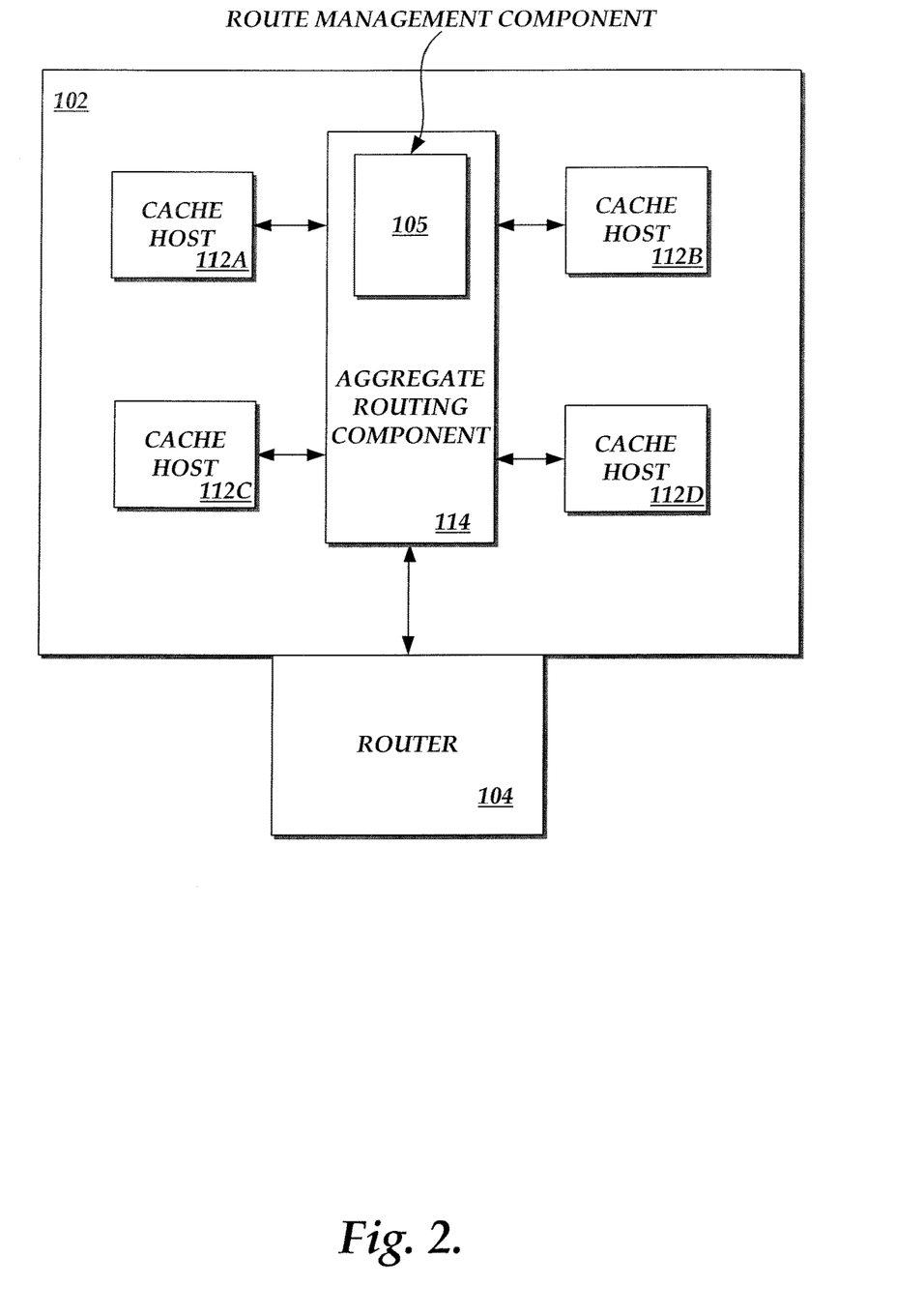
FIG. 2 is a block diagram illustrating an embodiment of a point-of-presence having cache hosts connected to a router through aggregate routing component.

FIG. 2 is a block diagram illustrating an embodiment of a POP 102, including multiple cache hosts 112 each connected to a router 104 through aggregate routing component 114, and a route management component 105 associated with aggregate routing component 114. Illustratively, there can be any number N of cache hosts 112. One skilled in the art will appreciate that aggregate routing component 114 can include one or more layers of routers. The number of layers of aggregate routing component 114 may depend on the number of cache hosts 112 in the POP 102. In some embodiments, the cache hosts 112 are directly connected to the router 104. Besides servers and routers, POPs 102 can also include digital/analog call aggregators, asynchronous transfer mode switches, and frame relays. A virtual IP address can be hosted in a cache host 112, but one skilled in the art will appreciate that the POP 102 in which the cache host 112 resides can also be said to "host" a virtual IP address.

Figure 3A:
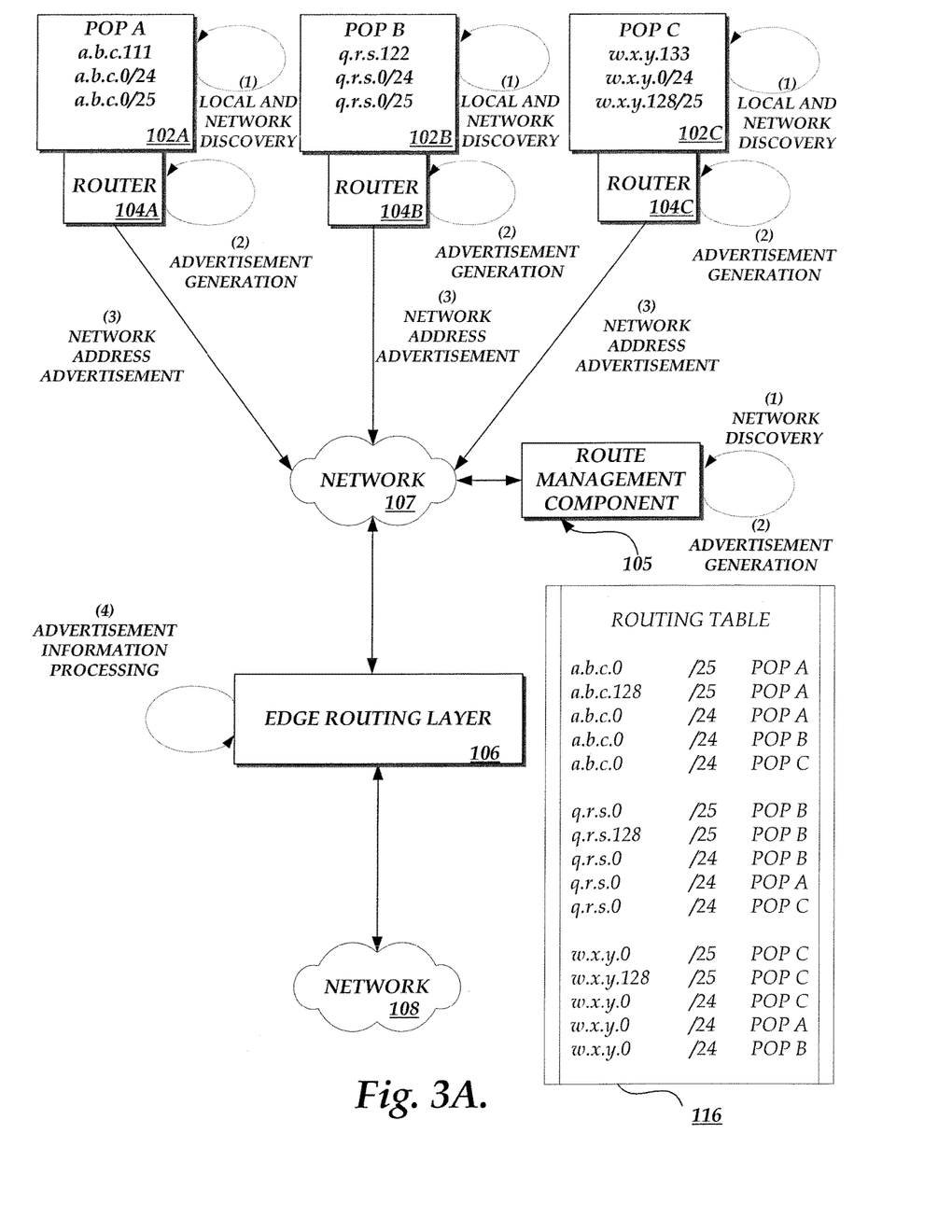
FIG. 3A illustrates a block diagram embodiment depicting the discovery, generation, and transmission of network address advertisements by all points-of-presence, the processing of network address advertisements by an edge routing layer, and the populating of a routing table.

FIG. 3A is a block diagram illustrating an embodiment of interconnected network components depicting communications between the POPs 102, and the edge routing layer 106. The sequence of communications depicted results in the population of the routing table 116. FIG. 3A generally illustrates how novel logic, which can be implemented at the POPs 102, configures the routers 104 to advertise their corresponding network addresses.

(1) Discovery

In the illustrated embodiment, the POPs 102 first determine the local virtual IP addresses hosted in the cache hosts of the POPs 102 and the network addresses of the routers 104 that correspond to the local virtual IP addresses. By way of non-limiting example, a POP 102 may determine the network addresses corresponding to the virtual IP addresses hosted in its own cache hosts by running a discovery process that sends out advertisements asking for routing and network address information. For example, discovery can be accomplished using Internet Control Message Protocol ("ICMP") router advertisements. In some embodiments, a POP 102 may determine which virtual IP address are hosted in its cache hosts 112 by looking up a hard-coded routing table, by communicating directly with its own cache hosts, by listening to advertisements sent by routers from the aggregate routing component 114, or by running some other internal registration process. Illustratively, each of the preceding processes can be directed by the route management component 105.

Each POP 102 can also discover the network addresses corresponding to the virtual IP addresses hosted in other POPs 102. A POP 102 running a discovery process may send out advertisements asking for routing and network address information of other POPs 102. By way of non-limiting example, a POP 102 may determine the network addresses for the virtual IP addresses hosted in the cache hosts 112 of other POPs 102 by looking up a hard-coded routing table, by communicating directly with the other POPs, by receiving messages from the edge routing layer 106, by listening to advertisements sent by routers from the aggregate routing component 114, or by running some other external internal registration process. Illustratively, each of the preceding processes can be directed by the route management component 105.

In the illustrated embodiment, by way of non-limiting example, POP A 102A is associated with the address a.b.c.111, POP B 102B is associated with the address q.r.s.122, and POP C 102C is associated with the address w.x.y.133. The 24-bit and 25-bit network addresses for the address a.b.c.111 are a.b.c.0/24, a.b.c.0/25, and a.b.c.128/25. The 24-bit and 25-bit network addresses for the address q.r.s.122 are q.r.s.0/24, q.r.s.0/25, and q.r.s.128/25. The 24-bit and 25-bit network addresses for the address w.x.y.133 are w.x.y.0/24, w.x.y.0/25, and w.x.y.128/25 respectively.

In some embodiments, network addresses of differing bit lengths can be used. For example, 25-bit network addresses can be announced in each advertisement for all POPs 102, and 26-bit network addresses can be used for the more specific path announcements. In some embodiments, there can be more than two levels of specificity in network address announcements. By way of illustration, an advertisement coming from an individual POP 102 can announce 24-bit network addresses for a set of POPs 102, 25-bit network addresses for a subset of POPs 102, and 26-bit network addresses for the virtual IP addresses hosted by the individual POP 102.

The illustrated embodiment shows one network address associated with a POP 102, but one skilled in the art will appreciate that a POP 102 can have one or more associated network addresses.

(2) Advertisement Generation

In the illustrated embodiment, routers 104 send advertisements announcing to the edge routing layer 106 and intermediate routers one or more network addresses. According to the present disclosure, the network management component 105 can be configured to generate advertisements that announce network addresses for each POP that corresponding to both its own virtual IP addresses as well as the virtual IP addresses hosted in other POPs 102. Illustratively, the router 104 at each POP 102 can also be configured to generate advertisements that announce network addresses corresponding to virtual IP addresses hosted in other POPs 102. The advertisement generated by a single router, for example router 104A, thus contains network addresses corresponding to virtual IP addresses hosted in POP A 102A as well as network addresses corresponding to virtual IP addresses hosted in other POPs. In accordance with the present disclosure, the route management component 105 or the router 104 at each POP 102 is further configured to include in the advertisements a second announcement of the network addresses for each POP, the second network address announcement being done at a higher level of specificity than the other network address announcements. The resulting advertisement being sent from a single router, for example router 104A, therefore contains two announcements for the network addresses hosted by its corresponding POP, POP A 102A, and one announcement for the network addresses hosted by other POPs, POP B 102B and POP C 102C. Similar advertisements can be sent by the other routers, 104B, and 104C.

The advertisement sent from any POP 102 can announce 24-bit network addresses not only for itself but also for the virtual IP addresses hosted in any of the other POPs. In the illustrated embodiment, each advertisement announces the network addresses: a.b.c.0/24, q.r.s.0/24, and w.x.y.0/24. The advertisement from POP A 102A further announces the network addresses a.b.c.0/25 and a.b.c.128/25, the advertisement from POP B 102B further announces the network address q.r.s.0/25 and q.r.s.128/25, and the advertisement from POP C 102C further announces the network address w.x.y.0/25 and w.x.y.128/25. The resulting advertisement therefore contains four announcements. In the illustrated embodiment, the advertisement for POP A 102A will announce a.b.c.0/24, a.b.c.0/25, a.b.c.128/25, q.r.s.0/24, and w.x.y.0/24, the advertisement for POP B 102B will announce a.b.c.0/24, q.r.s.0/24, q.r.s.0/25, q.r.s.128/25, and w.x.y.0/24, and the advertisement for POP C 102C will announce a.b.c.0/24, q.r.s.0/24, w.x.y.0/24, w.x.y.0/25, and w.x.y.128/25.

In the illustrated embodiment, each POP 102 generates advertisements for the network addresses corresponding to the virtual IP addresses hosted in the other POPs. In some embodiments, each POP 102 can generate advertisements for the network addresses corresponding to the virtual IP addresses hosted in every other POP 102. In some embodiments, each POP 102 can generate advertisements for the network addresses corresponding to the virtual IP addresses hosted in less than all of the other POPs 102. In some embodiments, one subset of POPs 102 can generate advertisements for the network addresses corresponding to the virtual IP addresses hosted in all of the POPs 102, while other POPs 102 only generate advertisements for their own network addresses.

(3) Network Address Advertisement

Generally, routers 104 send the generated advertisements out onto the network toward higher level routers, also known as sending the advertisements "upstream." In the illustrated embodiment, routers 104 send the generated advertisements upstream into the network 107. The advertisements can be eventually received by the edge routing layer 106. In a simple embodiment, the advertisements can be directly received from the routers 104 by the edge routing layer 106. In other embodiments, however, an advertisement of network addresses coming from a router 104 may be received by one or more intermediate upstream routers. Those intermediate routers can, in turn, repackage the information into their own advertisements to send upstream. This can happen over many layers of intermediate routing before information regarding the network addresses for the router 104 reaches the edge routing layer 106.

(4) Advertisement Information Processing

On receiving an advertisement from a router 104, the edge routing layer 106 can update its routing table 116 to reflect the announcements in the advertisement regarding the network addresses reachable through the router 104. In the illustrated embodiment, the edge routing layer receives advertisements from POPs A, B, and C 102 and, in turn, updates its routing table 116 to reflect the announcements in those advertisements. Specifically, for the network address a.b.c.0/24, the edge routing layer 106 now has three entries, one for each illustrated POP, in its routing table 116. For the network addresses a.b.c.0/25 and a.b.c.128/25, the edge routing layer has one entry each. Similarly, the routing table 116 at the edge routing layer 106 has three entries for the network address q.r.s.0/24 and one entry each for the network addresses q.r.s.0/25 and q.r.s.128/25, as well as three entries for the network address w.x.y.0/24 and one entry each for the network addresses w.x.y.0/25 and w.x.128/25.

Generally, in routing tables, network addresses are compared against destination IP addresses of incoming packets. However, one skilled in the art appreciates that routing tables contain information other than network addresses and the points-of-presence hosting those addresses. What other information a routing table may hold and the manner in which it can be organized can depend on the routing protocol used.

Figure 3B:
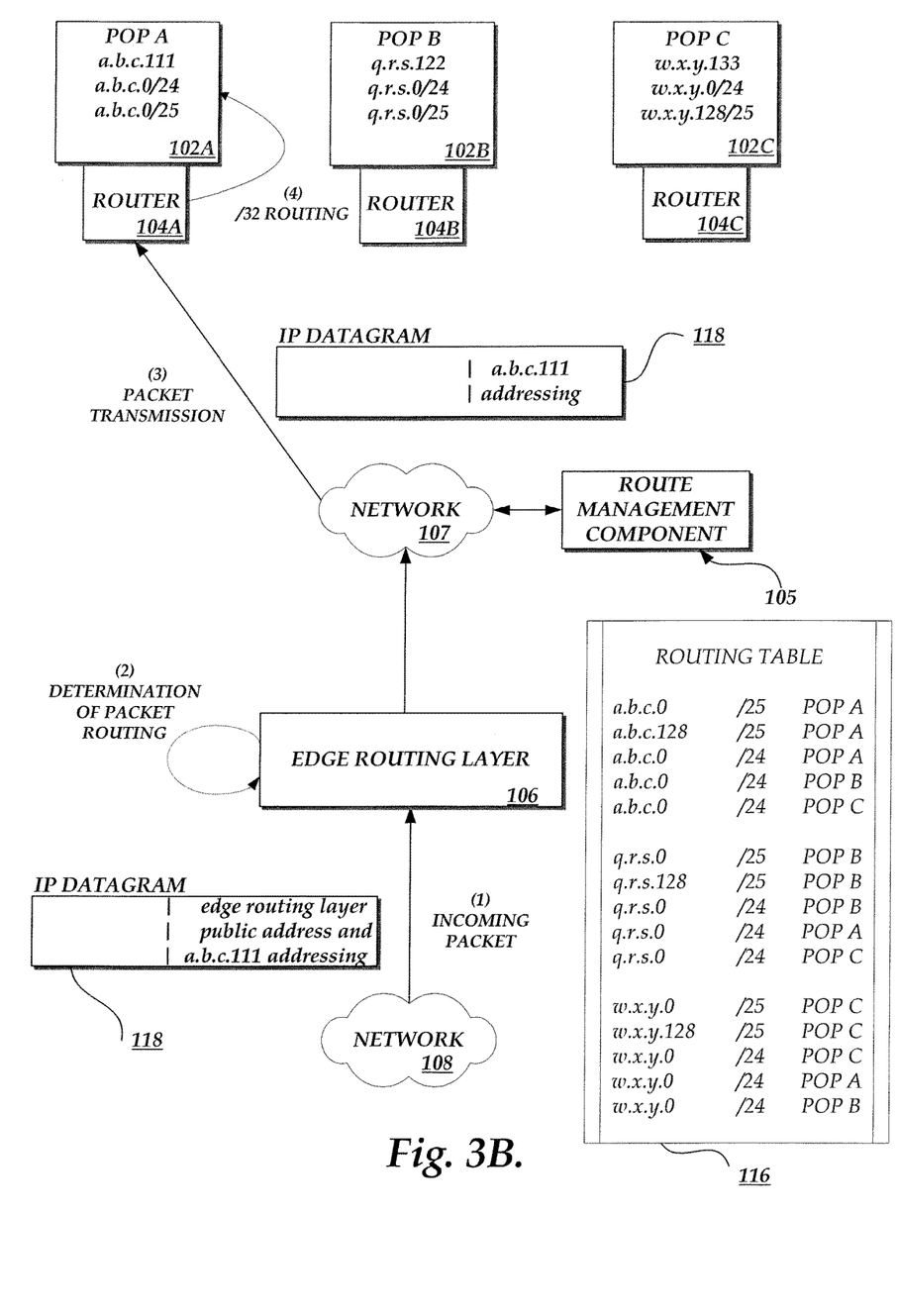
FIG. 3B illustrates a block diagram embodiment depicting the routing of a packet to a point-of-presence hosting the network address destination of that packet.

FIG. 3B is a block diagram illustrating an embodiment of interconnected network components depicting the routing of an incoming packet from a network 108 to the edge routing layer 106 to the routers 104 and finally to the POPs 102. FIG. 3B generally illustrates the operation of one embodiment of the present disclosure. More specifically, FIG. 3B shows how redundant network address advertisements implemented by novel logic function in such a fashion so as not to confuse the edge routing layer 112 or any intermediate routers in the transmitting of an incoming packet to its proper cache host 112.

(1) Incoming Packet

A packet originating at an end host 110 and addressed to a POP 102 can arrive at the edge routing layer 106 by way of a network 108. It will be appreciated by one skilled in the art that the IP datagram 118 in traveling through the network 108 may be routed through any number N of autonomous systems, routers and other network components. In the illustrated embodiment, an IP datagram 118 is transmitted from network 108 to the edge routing layer 106. Illustratively, the IP datagram 118 is addressed to a public IP address in the edge routing layer 106.

One with skill in the art will appreciate that in some embodiments, the network 108 can be a private network and the edge routing layer 106 can have a private address on the private network. In some embodiments, an incoming packet may include a public or private IP address of the edge routing layer 106 and additional addressing information associated with the destination address of the packet.

(2) Determination of Packet Routing

The edge routing layer 106 can process IP datagram addressing information to determine the destination address of the packet, which is a.b.c.111. The edge routing layer 106 looks up the corresponding network address in the routing table 116, sees that POP A 102A is advertising the network address a.b.c.0/25 and determines that POP A 102A is the POP advertising the most specific network address corresponding to the destination address of the packet. Though POP B 102B and POP C 102C are also both advertising the network address a.b.c.0/24, the IP datagram 118 will not be routed toward either POP B 102B or POP C 102C, as will be appreciated by one of skill in the art, cine they are advertising a less specific network address.

(3) Packet Transmission

In the illustrated embodiment, upon the determination that the incoming IP datagram 118 is to be routed to POP A 102A, the edge routing layer 106 forwards the IP datagram 118 toward router 104A. through the network 107. In some embodiments, the edge routing layer 106 will transmit the IP datagram 118 directly to router 104A. In some embodiments, the edge routing layer 106 will transmit the IP datagram 118 to an intermediate router, the intermediate router forwarding the IP datagram 118 toward router 104A in similar fashion. In some embodiments, there will be more than one intermediate layer of routers.

(4) Routing

In the illustrated embodiment, the virtual IP addresses are hosted in the cache hosts 112. Illustratively, the routers 104 associated with the POPs 102 can determine the routing of an incoming packet and transmit the packet to the cache host 112 hosting the virtual IP address of the packet. Illustratively, router 104A can maintain a routing table for each hosted 32-bit virtual IP address and its corresponding cache host 112.

Figure 4A:
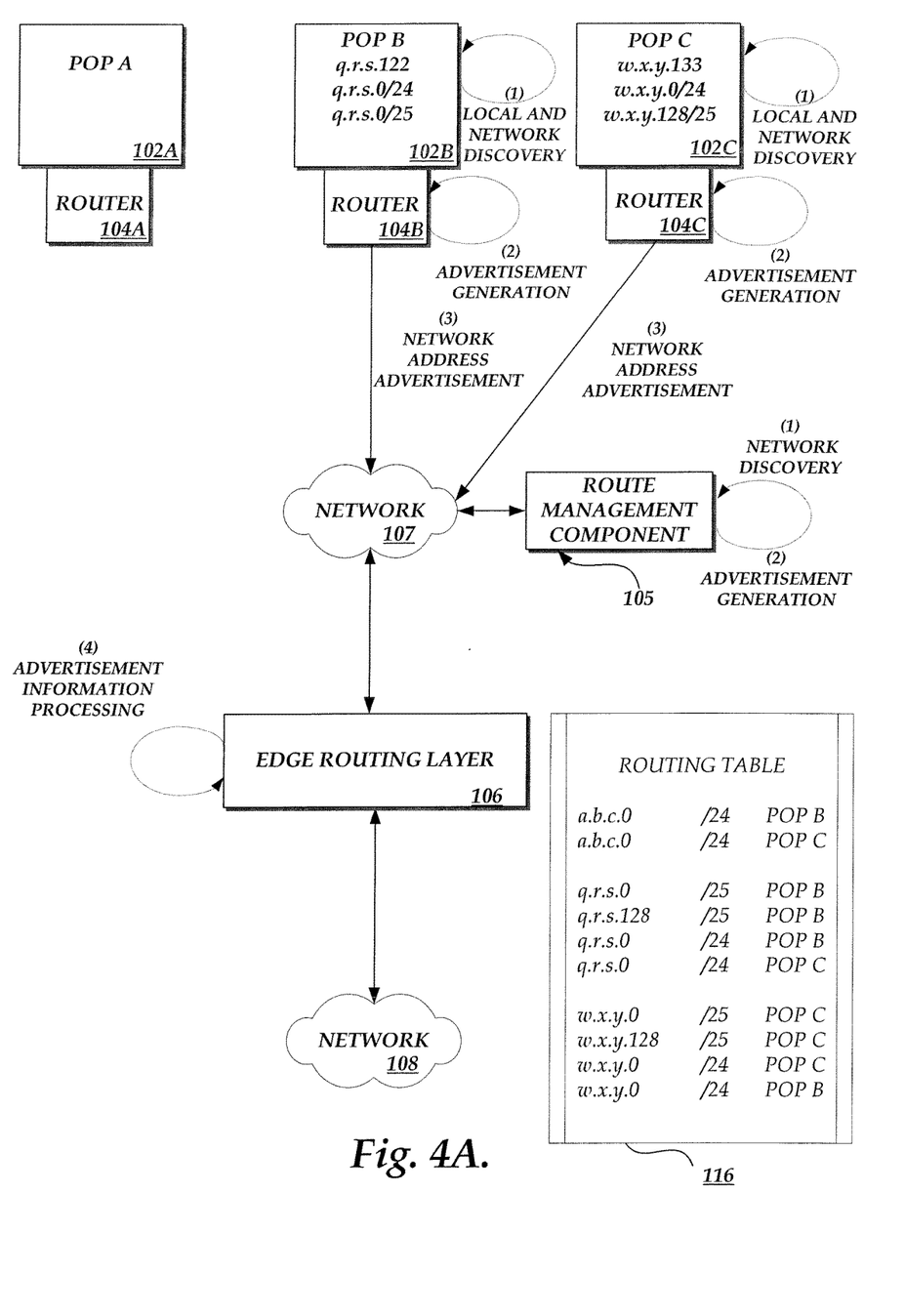
FIG. 4A illustrates a block diagram embodiment depicting the discovery, generation, and transmission of network address advertisements by healthy points-of-presence, the processing of network address advertisements by an edge routing layer, and the updating of a routing table.

FIG. 4A is a block diagram illustrating an embodiment of interconnected network components depicting communications from two POPs, 102B and 102C, through the network 107, to the edge routing layer 106. Once the sequence of communications depicted in the figure has been completed, the result is the updating of the routing table 116. FIG. 4A generally illustrates how novel logic can be implemented to advertise network addresses. Specifically, FIG. 4A illustrates how the network addresses for virtual IP addresses survive even when the POP 102 hosting those network addresses has had an outage. In some embodiments, an outage in a POP 102 is a partial outage.

(1) Discovery

In the illustrated embodiment, by way of non-limiting example, POP A 102A which hosts the address a.b.c.111, has had an outage and is not available. POP B 102B hosts the address q.r.s.122 and POP C 102C hosts the address w.x.y.133. Though POP A 102A is down, POP B 102B and POP C 102C retain the 24-bit network address a.b.c.0/24 of POP A 102A. POP B 102B and POP C 102C also retain their own 24-bit and 25-bit network addresses, as well as the 24-bit network addresses for the network addresses of the other POPs.

In some embodiments, the outage in POP A 102A can be a partial outage of some of the cache hosts 112. Illustratively, a router at a POP 102 advertising network addresses j.k.l.0/25 and j.k.l.128/25 could continue to advertise j.k.l.0/25 in the event of a failure of some of the cache hosts 112 at the network address j.k.l.128/25.

(2) Advertisement Generation

In the illustrated embodiment, unavailable router 104A will no longer send advertisements of the network addresses hosted in POP A 102A or the network addresses hosted in the other two POPs, 102B and 102C. The advertisement for POP B 102B still announces a.b.c.0/24, q.r.s.0/24, q.r.s.0/25, q.r.s.128/25, and w.x.y.0/24, and the advertisement for POP C 102C will announce a.b.c.0/24, q.r.s.0/24, w.x.y.0/24, w.x.y.0/25, and w.x.y.128/25.

(3) Network Address Advertisement

In the illustrated embodiment, as described above, router 104A no longer sends out advertisements announcing network addresses. Routers 104B and 104C continue to send the same advertisements, which still include the announcement for the network address assigned to POP A 102A, a.b.c.0/24.

One skilled in the art will appreciate that a POP 102 that is no longer communicating because of a failure or outage is also no longer "hosting" any virtual IP addresses. However a failed POP 102 may still be associated with the network addresses that corresponded to the virtual IP addresses it was previously hosting. In some embodiments, when a failed POP 102 becomes available again, or "comes back online," it will resume hosting any virtual IP addresses corresponding to the network addresses with which it remains associated.

(4) Advertisement Information Processing

In the illustrated embodiment, the edge routing layer 106 updates its routing table 116 to reflect the change in announcements regarding the network addresses reachable through the routers 104. In the illustrated embodiment, the edge routing layer receives advertisements from router 104B and router 104C. The edge routing layer updates its routing table 116 to reflect the announcements in those advertisements. Specifically, the routing table 116 now has two entries for the network address a.b.c.0/24, two entries for the network address q.r.s.0/24, one entry each for the network addresses q.r.s.0/25 and q.r.s.128/25, two entries for the network address w.x.y.0/24 and one entry each for the network addresses w.x.y.0/25 and w.x.y.128/25.

In some embodiments, the edge routing layer 106 updates the routing table 116 to reflect the absence of POP A 102A in response to a withdrawal advertisement sent from a router 104 at the POP 102 or from an upstream intermediate router. In some embodiments, the edge routing layer 106 updates the routing table 116 to reflect the absence of POP A 102A after a period of time in which the edge routing layer 106 has not received a status update regarding POP A 102A. In some embodiments, the edge routing layer 106 uses another networking protocol to updates its routing table 116.

Figure 4B:
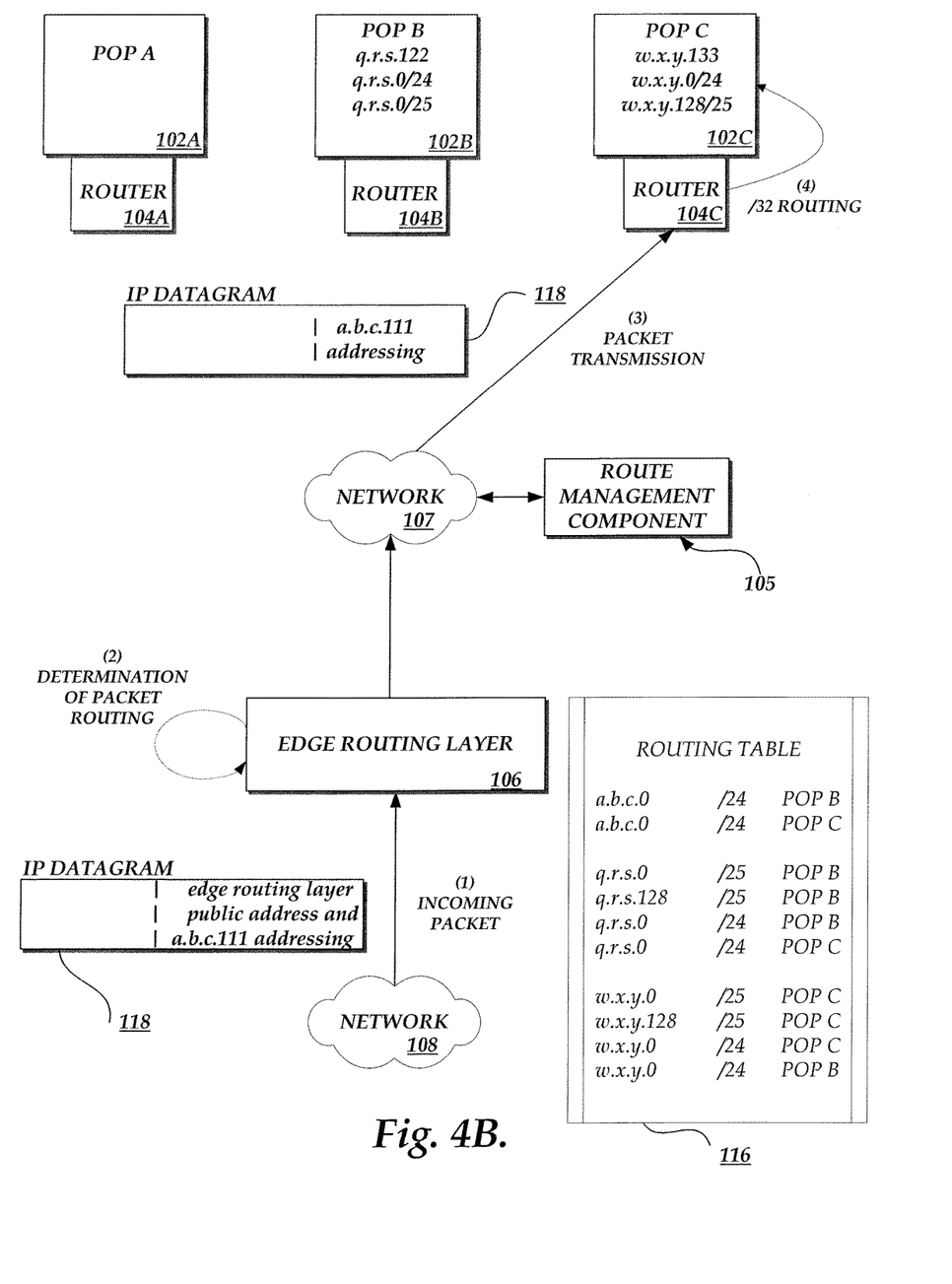
FIG. 4B illustrates a block diagram embodiment depicting the routing of a packet to a point-of-presence advertising the network address for a network that includes the destination address of that packet.

FIG. 4B is a block diagram illustrating an embodiment of interconnected network components depicting the routing of an incoming IP Datagram 118 from a network 108 to the edge routing layer 106 through a network 107 to a router 104C and to the POP 102C. FIG. 4B generally illustrates how the redundant network address advertisements implemented by the novel logic at the POPs 102 function in such a fashion as to provide failover routes for packets arriving at the edge routing layer 106 or any intermediate routers.

(1) Incoming Packet

A packet originating at an end host 110 and addressed to a cache host 112 in a POP 102 can arrive at the edge routing layer 106 by way of a network 108. It will be appreciated by one skilled in the art that the path taken by the IP datagram 118 through the network 108 may be routed through any number N of autonomous systems, routers and other network components. In the illustrated embodiment, an IP datagram 118 is transmitted from network 108 to the edge routing layer 106. Illustratively, the IP datagram is addressed to a public IP address in the edge routing layer 106.

(2) Determination of Packet Routing

The edge routing layer 106 processes the addressing information to determine the destination address of the packet, which is a.b.c.111. The edge routing layer 106 looks up the corresponding network address in the routing table 116, sees that POP B 102B and POP C 102C are both advertising the network address a.b.c.0/24. The edge routing layer 106 can select one of POP B 102B and POP C 102C. In the illustrated embodiment, the edge routing layer 106 selects POP C 102C. In some embodiments, the edge routing layer 106 can use a load-balancing protocol, such as equal cost multi-path routing ("ECMP"), to decide which POP 102 advertising the same network address the packet will be routed to. In some embodiments, the edge routing layer 106 can use a pre-determined preference metric to decide between multiple POPs 102 that are advertising the same network address.

(3) Packet Transmission

In the illustrated embodiment, upon the determination that the incoming IP datagram 118 is to be routed to POP C 102C, the edge routing layer 106 forwards the IP datagram 118 through the network 107 toward router 104C. In some embodiments, the edge routing layer will transmit the IP datagram 118 directly to router 104C. In some embodiments, the edge routing layer will transmit the IP datagram 118 to an intermediate router, the intermediate router forwarding the IP datagram 118 toward router 104C in similar fashion.

(4) Routing

In the illustrated embodiment, the address a.b.c.111 is no longer hosted in POP A 102A. As depicted, an IP datagram 118 addressed to a.b.c.111 is instead sent to router 104C which is associated with POP C 102C. The router 104C can then transmit the IP datagram 118 to one of its cache hosts 112. In some embodiments, router 104C will use a load-balancing protocol such as ECMP to select a cache host 112 for the IP datagram 118. On receiving the IP datagram 118, a cache host 112 may begin a new communications session using the virtual IP address of the IP datagram 118.

Figure 5:
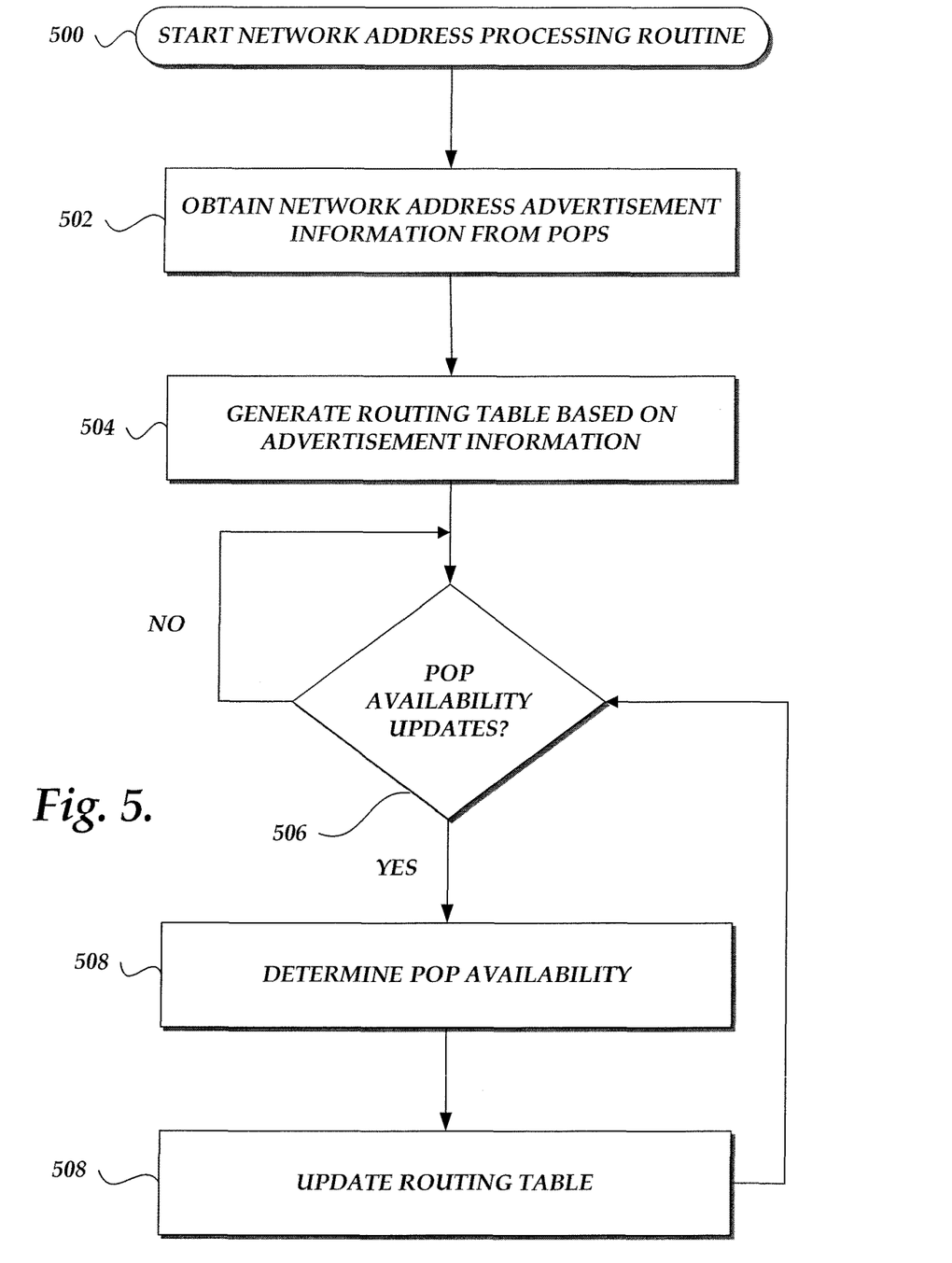
FIG. 5 illustrates a flow diagram of a routine for the processing of network address advertisements by an edge routing layer.

Generally, FIG. 5 is a flow chart depicting an embodiment of the process that the edge routing layer 106 may follow to populate and update its routing table 116 in response to receiving network address advertisements from POPs 102. At 502, the edge routing layer 106 receives an advertisement of network addresses from the POPs 102. At 504, the edge routing layer 106 can then generate and populate a routing table 116 based on the network addresses announced in each advertisement received. The edge routing layer 106 may then update the routing table 116 when receiving POP availability updates at 506. At 508, when a POP availability update is received, the routing table 116 may re-determine POP availability. At 508, if the POP availability update includes changes in network address announcements, the edge routing layer 106 can update the routing table 116 to reflect the changes. In some embodiments, the routing table 116 may only be updated when a POP availability update is received. In some embodiments, the routing table 116 can be updated when advertisements have not been received from a POP 102 in response to a request for information. In some embodiments, the routing table 116 will be updated at regular intervals.

Figure 6:
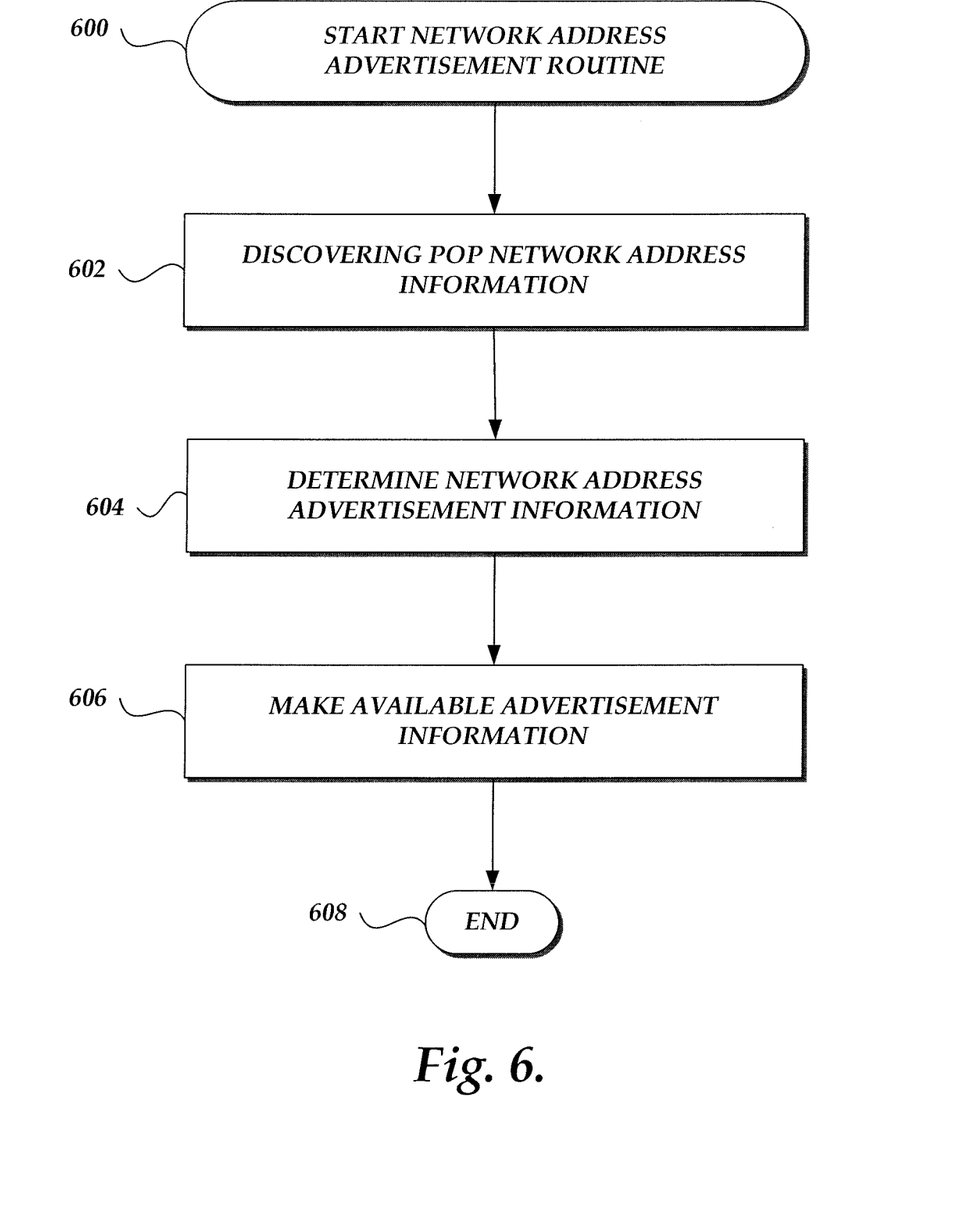
FIG. 6 illustrates a flow diagram of a routine for the creation and transmission of network address advertisements from a point-of-presence.

Generally, FIG. 6 is a flow chart depicting an embodiment of the process a route management component 105 and a router 104 associated with a point-of-presence 102 may follow to discover, generate, and transmit advertisements announcing the network addresses corresponding to the virtual IP addresses hosted in its cache hosts 112 as well as the cache hosts 112 of other points-of-presence 102. At 602, the router 104 can run a discovery process to determine its network addresses and the virtual IP addresses hosted in its own cache hosts 112. Also at 602, the router can run a discovery process to determine the network addresses corresponding to the virtual IP addresses hosted in cache hosts of other POPs 102. As described above, the discovery process 602 may involve sending out advertisements for connected routers, network, and autonomous systems. At 604, the route management component 105 or the routers 104 can process information received about network addresses of the POPs 102 to determine which network addresses to announce in the network address advertisements. As described above and in accordance with the present disclosure, the advertisements coming from a single POP 102 can be configured to advertise network addresses from one or more POPs 102. At 606, after the advertisement is generated, it can be transmitted to upstream routers and other network components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for advertising network addresses, comprising:
 a first point-of-presence associated with a first range of network addresses, wherein the first point-of-presence is configured to:
  advertise, at a first level of specificity, the first range of network addresses, wherein the first level of specificity corresponds to a first address prefix length;
  advertise, at the first level of specificity, at least one range of network addresses not associated with the first point-of-presence; and
  advertise, at a second level of specificity, the first range of network addresses, wherein the second level of specificity corresponds to a second address prefix length longer than the first address prefix length;
 a second point-of-presence associated with a second range of network addresses, wherein the second point-of-presence is configured to:
  advertise, at the first level of specificity, the second range of network addresses, wherein the second range of network addresses are included in the at least one range of network addresses not associated with the first point-of-presence;
  advertise, at the first level of specificity, the first range of network addresses associated with the first point-of-presence, wherein the second point-of-presence advertises the first range of network addresses at the first level of specificity during a first period of time in which the first point-of-presence is available and during a second period of time in which the first point-of-presence is unavailable; and
  advertise, at the second level of specificity, the second range of network addresses; and
 an edge routing layer configured to:
  store a routing table comprising first routing table data associating the first range of network addresses with the first point-of-presence at the second level of specificity; and
  in response to the second point-of-presence advertising the first range of network addresses at the first level of specify, generate second routing table data associating the first range of network addresses with the second point-of-presence as a failover for the first point-of-presence;
 wherein the first point-of-presence receives a first transmission addressed to an address in the first range of network addresses during the first period of time in which the first point-of-presence is available, and wherein the second point-of-presence receives a second transmission addressed to the address in the first range of network addresses during the second period of time in which the first point-of-presence is unavailable.

2. The system of claim 1, wherein the edge routing layer is further configured to:
 receive a packet addressed to a destination address; and
 route the packet to a point-of-presence advertising at a highest level of specificity for a range of network addresses containing the destination address of the packet.

3. The system of claim 2, wherein the routing table comprises routing table data representing routes corresponding to ranges of network addresses and levels of specificity for points-of-presence, and wherein the edge routing layer is configured to remove a route from the routing table based at least partly on receiving information that the route is no longer available.

4. The system of claim 1, wherein the first point-of-presence comprises at least one cache host, wherein a cache host is associated with a range of destination addresses and advertises the range of destination addresses at a third level of specificity.

5. The system of claim 1, wherein the first address prefix length comprises a number of bits of a network address less than a total number of bits of the network address.

6. A method of advertising ranges of network addresses, the method comprising:
 as performed by a first point-of-presence comprising one or more computing devices configured to execute specific instructions,
  obtaining a first range of network addresses associated with the first point-of-presence;
  obtaining a second range of network addresses associated with a second point-of-presence;
  generating a network address advertisement configured to:
   advertise, at a first level of specificity, the first range of network addresses, wherein the first level of specificity corresponds to a first address prefix length;
   advertise, at the first level of specificity, the second range of network addresses during a first period of time in which the second point-of-presence is available and a second period of time in which the second point-of-presence is unavailable; and
   advertise, at a second level of specificity, the first range of network addresses, wherein the second level of specificity corresponds to a second address prefix length longer than the first address prefix length;
  transmitting the network address advertisement, wherein an edge routing layer has a routing table comprising first routing table data associating the second range of network addresses with the second point-of-presence at the second level of specificity, and wherein in response to the first point-of-presence transmitting the network address advertisement, the edge routing layer generates second routing table data associating the second range of network addresses with the first point-of-presence as a failover for the second point-of-presence; and
  receiving a transmission addressed to an address in the second range of network addresses during the second period of time in which the second point-of-presence is unavailable.

7. The method of claim 6, wherein the network address advertisement is configured to advertise at the first level of specificity the second range of network addresses to serve as a failover.

8. The method of claim 6, wherein generating the network address advertisement comprises configuring the network address advertisement to advertise, at a third level of specificity, at least one destination address associated with at least one point-of-presence, wherein the third level of specificity corresponds to a third address length that is longer than both the first address length and the second address length.

9. The method of claim 6, wherein obtaining the second range of network addresses comprises obtaining the second range of network addresses from the edge routing layer.

10. The method of claim 9, wherein the edge routing layer comprises routes corresponding to the advertised ranges of network addresses and levels of specificity for each point-of-presence, the edge routing layer configured to remove a route after the route is no longer available.

11. The method of claim 6, wherein generating the network address advertisement comprises configuring the network address advertisement to advertise, at a third level of specificity, the second range of network addresses, wherein the third level of specificity corresponds to a third address length that is shorter than both the first address length and the second address length.

12. The method of claim 6, wherein advertising, at the first level of specificity, the second range of network addresses comprises advertising up to 24 significant bits of a network address.

13. The method of claim 6, wherein advertising, at the second level of specificity, the first range of network addresses comprises advertising at least 25 significant bits of a network address.

14. A system comprising:
   a first point-of-presence associated with a first range of network addresses, wherein the first point-of-presence is configured to:
      transmit first network address information indicating, at a first level of specificity, that the first range of network addresses is accessible via the first point-of-presence, wherein the first level of specificity corresponds to a first address prefix length;
      transmit second network address information indicating, at the first level of specificity, that a second range of network addresses associated with a second point-of-presence is accessible via the first point-of-presence, wherein the first point-of-presence transmits the second network address information during a first period of time in which the second point-of-presence is available and a second period of time in which the second point-of-presence is unavailable;
      transmit third network address information indicating, at a second level of specificity, that the first range of network addresses is accessible via the first point-of-presence, wherein the second level of specificity corresponds to a second address prefix length longer than the first address prefix length; and
      receive a transmission addressed to an address in the second range of network addresses during the second period of time in which the second point-of-presence is unavailable; and
   an edge routing layer comprising one or more computing devices configured to:
      receive a packet addressed to a destination address; and
      route the packet to a particular point-of-presence that has transmitted network address information indicating that a range of network addresses, comprising the destination address of the packet, is accessible via the particular point-of-presence, wherein the particular point-of-presence transmitted the network address information at a level of specificity corresponding to a longest address prefix length of all points-of-presence transmitting network addresses information regarding the range of network addresses comprising the destination address of the packet.

15. The system of claim 14, wherein the edge routing layer has a routing table, the routing table comprising routes corresponding to ranges of network addresses and levels of specificity for each point-of-presence, the edge routing layer configured to remove a route from the routing table on receiving information that the route is no longer available.

16. The system of claim 14, wherein the first point-of-presence comprises at least one cache host, wherein a cache host is associated with a range of destination addresses and is configured to transmit network address information, at a third level of specificity, indicating the range of destination addresses is available via the cache host.

17. The system of claim 14, wherein the first level of specificity and the second level of specificity correspond to a number of bits of a network address.

18. The system of claim 14,
   wherein the edge routing layer has a routing table comprising first routing table data associating the second range of network addresses with the second point-of-presence at the second level of specificity, and
   wherein in response to the first point-of-presence transmitting the second network address information, the edge routing layer generates second routing table data associating the second range of network addresses with the first point-of-presence as a failover for the second point-of-presence.

19. The system of claim 1, wherein the edge routing layer comprises one or more computing devices separate from the first point-of-presence and separate from the second point-of-presence.

20. The computer-implemented method of claim 6, further comprising:
   determining that the transmission is associated with a first communication session between a computing device and the second point-of-presence; and
   establishing a second communication session between the first point-of-presence and the computing device;
   determining that the second point-of-presence is available; and
   ending the second communication session, wherein the computing device and the second point-of-presence resume the first communication session.

* * * * *

UNITED STATES PATENT AND TRADEMARK OFFICE
CERTIFICATE OF CORRECTION

PATENT NO. : 10,205,663 B1
APPLICATION NO. : 14/582125
DATED : February 12, 2019
INVENTOR(S) : Harvo Reyzell Jones et al.

Page 1 of 1

It is certified that error appears in the above-identified patent and that said Letters Patent is hereby corrected as shown below:

In the Claims

In Column 13, Line 53, Claim 1, change "specify," to --specificity,--.

Signed and Sealed this
Eighteenth Day of June, 2019

Andrei Iancu
*Director of the United States Patent and Trademark Office*